US006658515B1

(12) United States Patent
Larson et al.

(10) Patent No.: US 6,658,515 B1
(45) Date of Patent: Dec. 2, 2003

(54) BACKGROUND EXECUTION OF UNIVERSAL SERIAL BUS TRANSACTIONS

(75) Inventors: Mark A. Larson, Austin, TX (US); Benjamen G. Tyner, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/491,177

(22) Filed: Jan. 25, 2000

(51) Int. Cl.$^7$ ............................................... G06F 13/24
(52) U.S. Cl. ...................................... 710/260; 710/266
(58) Field of Search ......................... 710/17, 110, 107, 710/113, 116, 48, 18, 260, 73, 53, 4, 52, 20, 266, 267, 269, 100, 22, 9, 21, 57, 3; 709/245; 341/22; 711/118; 703/24, 25, 27, 23; 713/324, 168

(56) References Cited

U.S. PATENT DOCUMENTS

| | | | |
|---|---|---|---|
| 5,041,962 A | | 8/1991 | Lunsford ..................... 364/200 |
| 5,237,692 A | * | 8/1993 | Raasch et al. ............... 710/267 |
| 5,465,346 A | | 11/1995 | Parks et al. .................. 395/296 |
| 5,590,312 A | * | 12/1996 | Marisetty ..................... 703/23 |
| 5,623,673 A | * | 4/1997 | Gephardt et al. ........... 710/260 |
| 5,657,457 A | | 8/1997 | Gaskins ...................... 395/287 |
| 5,737,579 A | | 4/1998 | Kimura ....................... 395/500 |
| 5,796,984 A | * | 8/1998 | Pearce et al. ................. 703/24 |
| 5,802,318 A | * | 9/1998 | Murray et al. .............. 710/100 |
| 5,857,083 A | | 1/1999 | Venkat ........................ 395/309 |
| 5,867,728 A | | 2/1999 | Melo et al. .................. 395/828 |
| 5,896,534 A | * | 4/1999 | Pearce et al. ................. 710/17 |
| 5,907,689 A | * | 5/1999 | Tavallaei et al. ............ 710/110 |
| 5,909,592 A | | 6/1999 | Shipman ..................... 395/830 |
| 5,943,506 A | * | 8/1999 | Poisner ......................... 710/48 |
| 5,958,020 A | * | 9/1999 | Evoy et al. .................... 710/3 |
| 5,968,139 A | | 10/1999 | Klein .......................... 710/10 |
| 5,974,486 A | * | 10/1999 | Siddappa ..................... 710/53 |
| 5,987,530 A | * | 11/1999 | Thomson ....................... 710/4 |
| 5,991,826 A | | 11/1999 | McGee et al. ................. 710/8 |
| 6,009,529 A | | 12/1999 | Park ........................... 713/320 |
| 6,266,715 B1 | * | 7/2001 | Loyer et al. .................. 710/22 |
| 6,338,139 B1 | * | 1/2002 | Ando et al. ................. 713/168 |

OTHER PUBLICATIONS

Stephen D. Jue, Todd R. Martin; "Method and System For Responding To A Failed Bus Operation In An Information Processing System"; Filed Sep. 3, 1999; U. S. Ser. No.: 09/930,014; specification pp. 1–15; claims pp. 16–26. (Copy not enclosed).
Marc D. Alexander; "Method and System For Executing BIOS Code In Secure Multitasking Operating Environment"; Filed Jan. 20, 1999; Ser. No.: 09/234,435; specification pp. 1–9; claims pp. 10–13. (Copy not enclosed).
Mark A. Larson, Benjamen G. Tyner; "Bus Controller Operating Code In System Memory"; Unfiled U.S. Patent Application reference No. M–8131 US. (Copy not enclosed).
Khanh T. Nguyen; "Video Data Error Detection"; Unfiled U.S patent application reference No. M–8111 US. (Copy not enclosed).
Benjamen G. Tyner; Access Restriction of Environmental Circuits; Unfiled U.S. patent application reference No. M–8110 US. (Copy not enclosed).
"Universal Serial Bus Specification Revision 1.1"; © 1998, Compaq Computer Corporation, Intel Corporation, Microsoft Corporation, NEC Corporation, Chapters 1–11; pp ii–311.

* cited by examiner

Primary Examiner—Tim Vo
(74) Attorney, Agent, or Firm—Baker Botts L.L.P.

(57) ABSTRACT

A method, computer program product and computer system that features intermittently entering the system management mode of a processor to commence and terminate I/O activity between external devices and computer system resources. To that end, a system management interrupt handler is included that monitors bus transactions between a bus controller and an external device that is the subject of I/O activity. Upon sensing the completion of a bus transaction, the system management interrupt handler transmits a system management interrupt to the processor. In response thereto, the processor reads a buffer in the bus controller and provides the requisite resources with the I/O information contained therein.

11 Claims, 6 Drawing Sheets

BACKGROUND EXECUTION OF UNIVERSAL SERIAL BUS TRANSACTIONS

BACKGROUND OF THE INVENTION

1. Field of the Invention

The present invention relates to computer systems. More particularly, the present invention is directed to a communication protocol for transmitting data over a universal serial bus while a computer is in the system management mode.

2. Description of the Background Art

Referring to FIG. 1 typical computer systems, such as computer 14, includes one or more system buses 22 placing various components of the system in data communication. For example, a microprocessor 24 is placed in data communication with both a read only memory (ROM) 26 and random access memory (RAM) 28 via the system bus 22. The ROM 26 contains among other code, the Basic Input-Output system (BIOS) which controls basic hardware operation such as the interaction with peripheral components such as disk drives 30 and 32, as well as the keyboard 34. The RAM 28 is the main memory into which the operating system and application programs are loaded and affords at least 32 megabytes of memory space. The memory management chip 36 is in data communication with the system bus 22 to control direct memory access (DMA) operations. DMA operations include passing data between the RAM 28 and the hard disk drive 30 and the floppy disk drive 32.

Also in data communication with the system bus 22 are various I/O controllers: a keyboard controller 38, a mouse controller 40 and a video controller 42. The keyboard controller 38 provides a hardware interface for the keyboard 34, the mouse controller 40 provides the hardware interface for a mouse 46, or other point and click device, and the video controller 42 provides a hardware interface for a display 48. Each of the aforementioned I/O controllers in data communication with an interrupt controller over an interrupt request line. The interrupt controller is in data communication with the processor to prioritize the interrupts it receives and transmits the interrupt requests to the processor. A drawback with the aforementioned architecture is that a limited number of interrupt request lines are provided. This limited the number of I/O devices that a computer system could support.

A Universal Serial Bus (USB) specification has been developed to increase the number of peripheral devices that may be connected to a computer system. The USB specification is a proposed standard recently promulgated by a group of companies including Compaq Computer Corporation, Digital Equipment Corporation, International Business Machines Corporation, Intel Corporation, Microsoft Corporation, and Northern Telecom Limited. Described below are various aspects of the USB relevant to a complete understanding of the present invention. Further background concerning the USB may be obtained from USB Specification, Revision 1.1.

The USB is a serial bus that supports data exchanges between a host computer and as many as 127 devices on a single interrupt request line. This provided beneficial, especially when employed with processors that supported Intel's System management Mode architecture, such as Intel's Pentium® line of processors. Specifically, it was found that effectuating USB transactions in a processor's real-address mode limited the software platforms that may be supported. Many of the software platforms remapped the interrupt vector table thereby frustrating transactions over the universal serial bus. As a result, it is standard in the computer industry to effectuate USB transactions when the processor operates in the system management mode (SMM).

A system management interrupt (SMI) applied to the SMI pin of the processor invokes the SMM mode. The SMI results from an interrupt request sent by, inter alia, a USB controller. In response, the processor saves the processor's context and switches to a different operating environment contained in system management RAM (SMRAM). While in SMM, all interrupts normally handle by the operating system are disabled. Normal-mode, i.e., real-mode or protected-mode, operation of the processor occurs upon receipt of a resume (RSM) on the SMI pin. As can be readily seen, all USB transactions are associated with a common interrupt line, namely, the SMI pin.

To facilitate communication between the computer system and 127 peripheral devices over a common serial line, the USB specification defines transactions between a host in data communication with a plurality of devices over interconnects. The USB interconnect defines the manner in which the USB devices are connected to and communicate with the USB host controller. There is generally only one host on any USB system. A USB interface to the host computer system is referred to as the host controller. The host controller may be implemented in a combination of hardware, firmware, or software. USB devices are defined as (1) hubs, which provide additional attachment points to the USB, or (2) functions, which provide capabilities to the system; e.g., an ISDN connection, a digital joystick, or speakers. Hubs indicate the attachment or removal of a USB device in its per port status bit. The host determines if a newly attached USB device is a hub or a function and assigns a unique USB address to the USB device. All USB devices are accessed by a unique USB address. Each device additionally supports one or more endpoints with which the host may communicate.

FIG. 2 shows a computer system that employs a universal serial bus. The host computer 50 includes the I/O driver 52, a USB driver 54 and USB interface logic circuit 56. The I/O driver 52 continues to model the I/O device 58 as a group of registers. To access a hardware register in I/O device 58, however, the I/O driver 52 first passes its read or write data request to the USB driver 54 that coordinates construction and transmission of the Token, Data and Handshake packets required by USB protocol for transferring data to or from the I/O device 58. The CPU with USB port (device interface) 60 is connected to I/O device 58 and is configured by firmware 62 to act as an interface allowing I/O device 58 to communicate with the host via the USB. Device interface 60 receives and decodes incoming packets (e.g. host generated Token packets) and generates complimentary Data or Handshake packets needed to complete a data transfer between I/O device 58 and host computer 50. A drawback with USB transactions is each requires a great amount of bandwidth.

Recognizing the aforementioned problem with USB transactions, U.S. Pat. No. 5,987,530 to Thomson discloses an apparatus and method for caching data in a universal serial bus (USB) system that reduces both the response time and the data traffic between the host computer and I/O device. The host computer is coupled to the I/O device via a USB system. The host computer includes a data cache for storing data retrieved from the I/O device. The data cache allows data to be returned to the host computer upon request without accessing the I/O device via a USB transaction. A cacheability look-up table and cache table is provided to ensure the integrity of data returned to the host computer. Requested data is returned from the I/O device if the cacheability look-up table indicates the requested data is noncacheable. Data is returned from the data cache if the cache table indicates the requested data is available in the cache as valid data. If the cache table indicates the requested data is not available in the cache as valid data, the requested data is returned from the I/O device along with data stored in predetermined I/O device addresses. The additional data is stored in the cache for subsequent access by the host computer. However, the aforementioned system requires the processor associated with the host computer to be in the system management mode for a significant amount of time which may adversely the operating system and other time sensitive applications.

What is needed, therefore, is a technique for effectuating USB transactions with a processor employing the SMM architecture while minimizing the processor bandwidth required to complete the same.

SUMMARY OF THE INVENTION

Provided is a method, computer program product and computer system that features intermittently entering the system management mode of a processor to commence and terminate I/O activity between external devices and computer system resources. To that end, a system management interrupt handler is included that monitors bus transactions between a bus controller and an external device that is the subject of I/O activity. Upon sensing the completion of a bus transaction, the bus controller transmits a system management interrupt to the processor. In response thereto, the processor reads a transaction buffer in the system memory and provides the requisite resources with the I/O information contained therein.

The method includes commencing a bus transaction after a processor has commenced a System Management Mode; and exiting the System Management Mode before completion of said bus transaction. Typically, the bus transaction is completed before once again entering the system management mode. After the bus transaction completes, the processor enters the system management mode and allows I/O information to be sent to one of a plurality of system resources. Concurrently with sending the I/O information to the system resource, an additional bus transaction may be commenced. The computer system and computer program product each includes features that operate in accordance with the aforementioned method.

DETAILED DESCRIPTION

Figure 1:
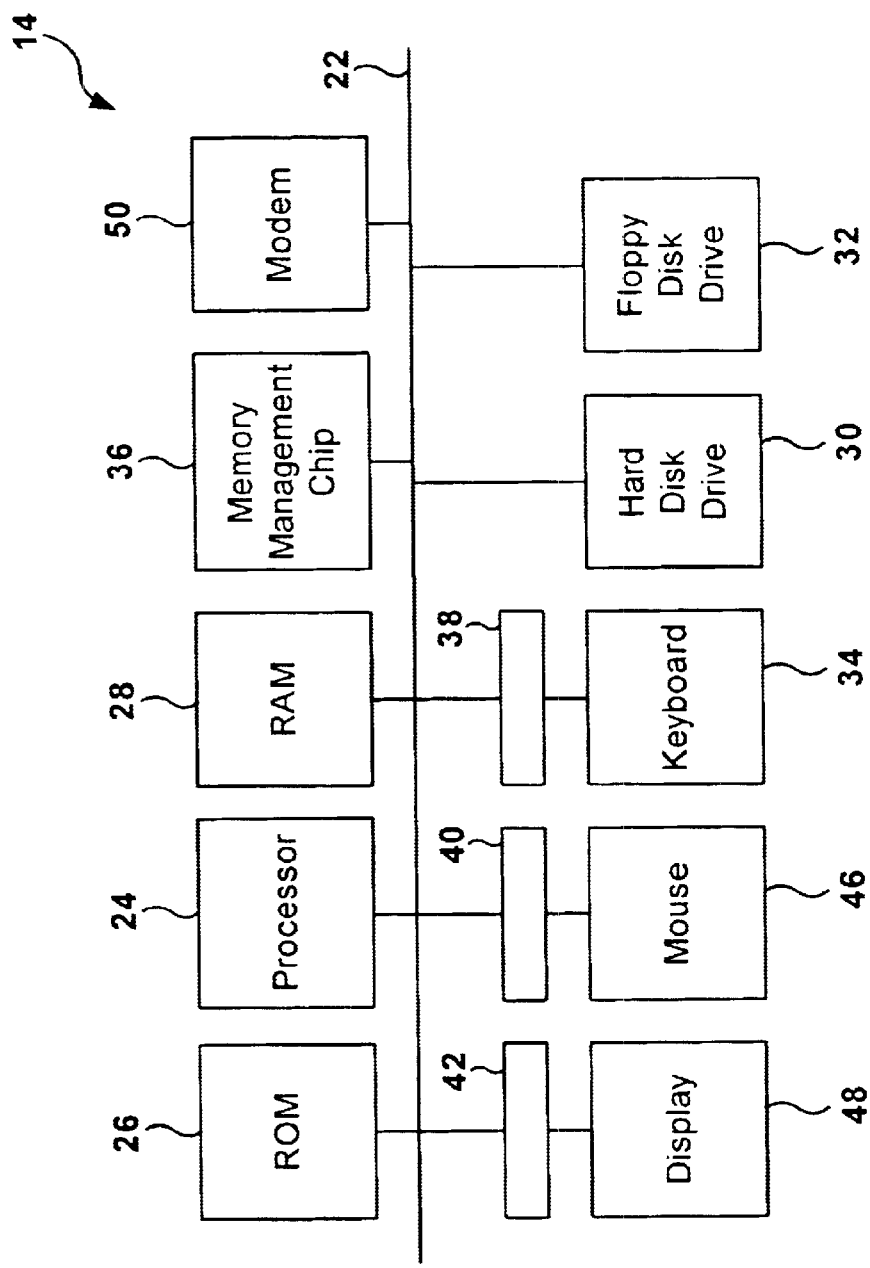
FIG. 1 is a schematic of a prior art computer system employing ISA and PCIA bus communication between a processor and an external device.
Figure 2:
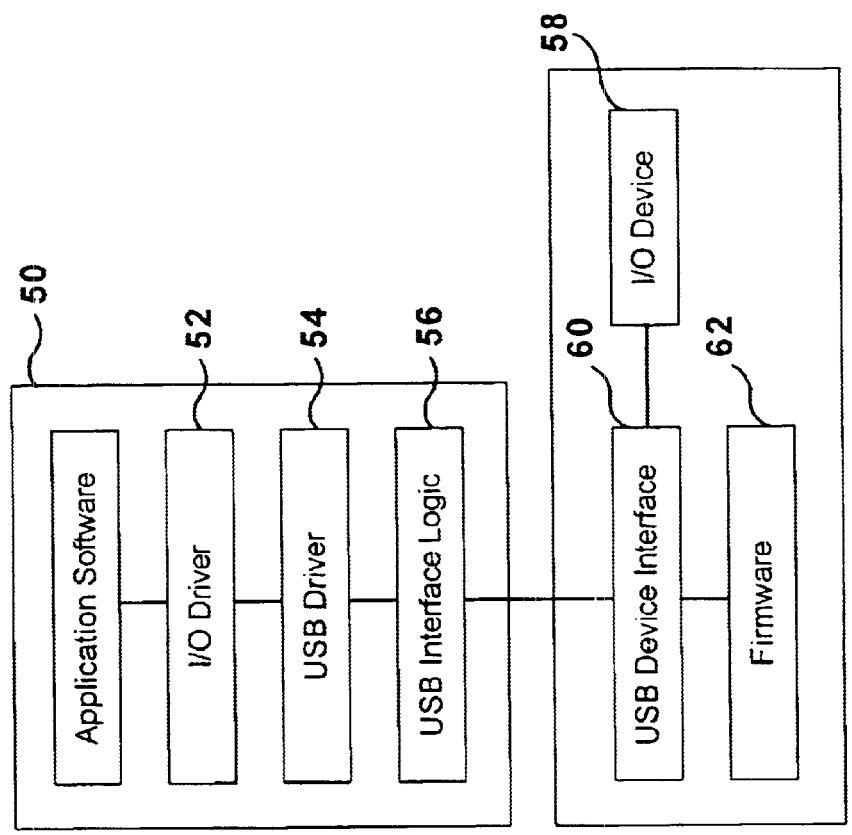
FIG. 2 is a prior art computer system employing a universal system bus specification to facilitate communication between a processor and an external device.
Figure 3:
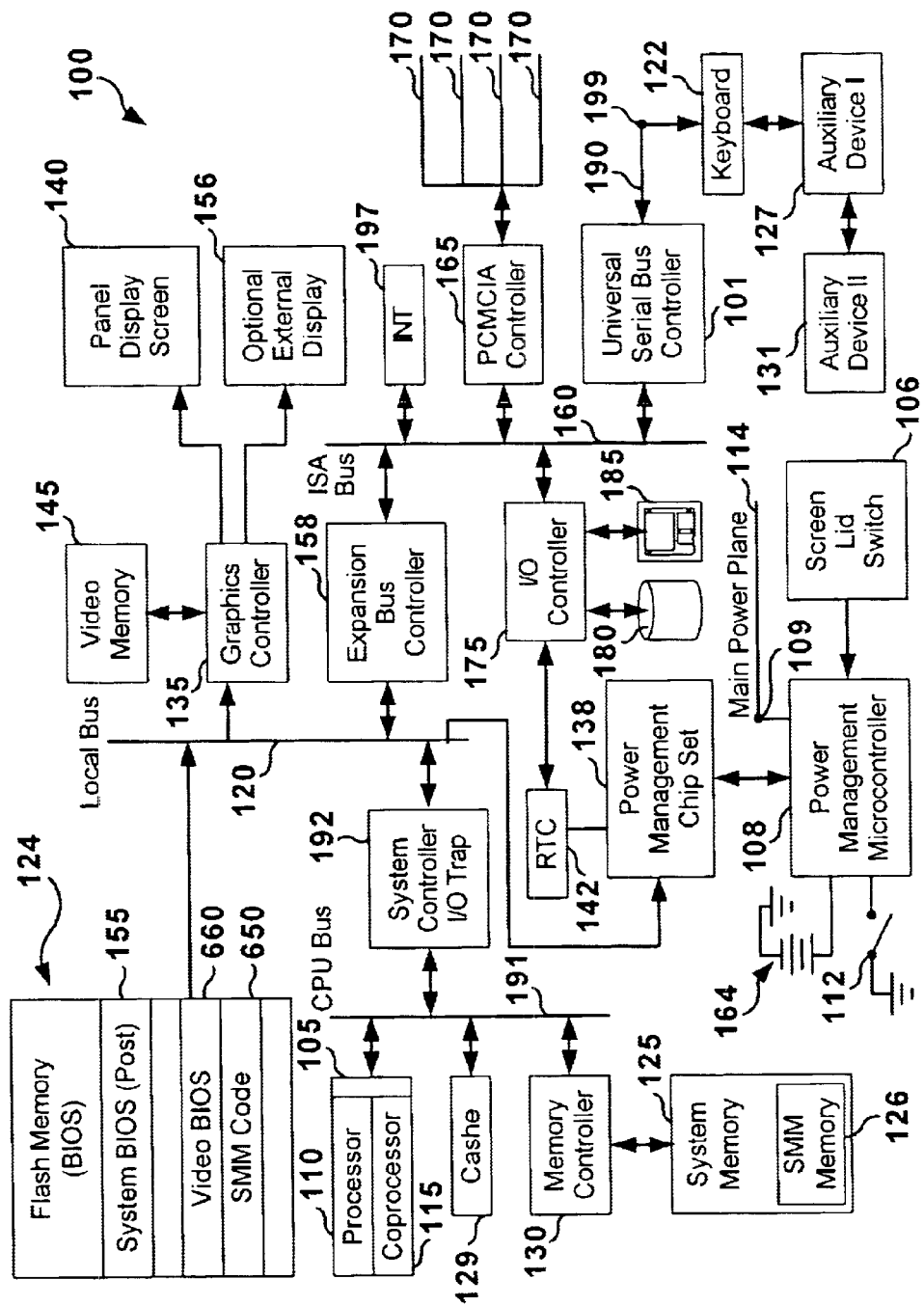
FIG. 3 is a block diagram showing a computer system in accordance with the present invention.

Referring to FIG. 3, PC system 100 includes a microprocessor ("CPU") 105, for example, an Intel® Pentium® class microprocessor, having a processor 110 for handling integer operations and a coprocessor 115 for handling floating point operations. CPU 105 is coupled to cache 129 and memory controller 130 via CPU bus 191. System controller I/O trap 192 couples CPU bus 191 to local bus 120 and is generally characterized as part of a system controller such as Pico Power Vesuvious or an Intel™ Mobile Triton chip set. System controller I/O trap 192 can be programmed in a well-known manner to intercept a particular target address or address range.

A main memory 125 of dynamic random access memory ("DRAM") modules is coupled to local bus 120 by a memory controller 130. Main memory 125 includes a system management mode memory area that is employed to store converter code to implement conversion methodology embodiments as will be discussed in more detail subsequently. A (BIOS) memory 124 is coupled to local bus 120. A FLASH memory or other nonvolatile memory is used as BIOS memory 124. BIOS memory 124 stores the system code which controls some PC system 100 operations as discussed above.

A graphics controller 135 is coupled to local bus 120 and to a panel display screen 140. Graphics controller 135 is also coupled to a video memory 145 that stores information to be displayed on panel display 140. Panel display 140 is typically an active matrix or passive matrix liquid crystal display ("LCD") although other display technologies may be used as well. Graphics controller 135 can also be coupled to an optional external display or standalone monitor display 156 as shown in FIG. 3. One graphics controller that can be employed as graphics controller 135 is the Western Digital WD90C24A graphics controller.

A bus interface controller or expansion bus controller 158 couples local bus 120 to an expansion bus 160. In this particular embodiment, expansion bus 160 is an Industry Standard Architecture ("ISA") bus although other buses, for example, a Peripheral Component Interconnect ("PCI") bus, could also be used. A personal computer memory card international association ("PCMCIA") controller 165 is also coupled to expansion bus 160 as shown. PCMCIA controller 165 is coupled to a plurality of expansion slots 170 to receive PCMCIA expansion cards such as modems, fax cards, communications cards, and other input/output devices. Interrupt request generator 197 is also coupled to ISA bus 160 and issues an interrupt service request over a predetermined interrupt request line after receiving a request to issue interrupt instruction from CPU 105. An I/O controller 175, often referred to as a super I/O controller is coupled to ISA bus 160. I/O controller 175 interfaces to both an integrated drive electronics ("IDE") hard drive 180 and a floppy drive 185.

USB controller 101 transfers data to and from CPU 105 via ISA bus 160. Keyboard 122, auxiliary device I 127, and auxiliary device II 131 are connected serially to USB connector 199. This interconnection topology is implemented according to the USB technology standard. External devices which include keyboard 122, auxiliary device I 127, and auxiliary device II 131 communicate with CPU 105 via USB controller 101. Auxiliary devices may be any communication device such as a mouse, modem joystick, or another PC system. When USB controller 101 receives data from the connected external devices, USB controller 101 is connected to issue an interrupt to the SMI pin of the CPU 105, discussed more fully below.

PC system 100 includes a power supply 164 that may include an analog to digital converter to allow coupling the PC system 100 to an AC power source. Alternatively, a battery may provide power to the many devices that form PC system 100. In this embodiment, the power supply 164 may include a rechargeable battery, such as a nickel metal hydride ("NiMH") or lithium ion battery, where the PC system 100 is embodied as a portable or notebook computer. Power supply 164 is coupled to a power management microcontroller 108, which controls the distribution of power from power supply 164. More specifically, microcontroller 108 includes a power output 109 coupled to the main power plane 114 which supplies power to CPU 105. Power microcontroller 108 is also coupled to a power plane (not shown) which supplies power to panel display 140. In this particular embodiment, power control microcontroller 108 is a Motorola 6805 microcontroller. Microcontroller 108 monitors the charge level of power supply 164 to determine when to charge and when not to charge battery 164. Microcontroller 108 is coupled to a main power switch 112, which the user actuates to turn the PC system 100 on, and off. While microcontroller 108 powers down other portions of PC system 100 such as hard drive 180 when not in use to conserve power, microcontroller 108 itself is always coupled to a source of energy, namely power supply 164.

Were the PC system 100 a portable computer, a screen lid switch 106 or indicator 106 may be included that provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer that swings from an open position for interaction with the user to a close position.

PC system 100 also includes a power management chip set 138 that includes power management chip models PT86C521 and PT86C522 manufactured by Pico Power. Power management chip set 138 is coupled to CPU 105 via local bus 120 so that power management chip set 138 can receive power control commands from CPU 105. Power management chip set 138 is connected to a plurality of individual power planes which supply power to respective devices in PC system 100 such as hard drive 180 and floppy drive 185, for example. In this manner, power management chip set 138 acts under the direction of CPU 105 to control the power to the various power planes and devices of the computer. A real time clock ("RTC") 142 is coupled to I/O controller 175 and power management chip set 138 such that time events or alarms can be transmitted to power management chip set 138. Real time clock 142 can be programmed to generate an alarm signal at a predetermined time.

When PC system 100 is turned on or powered up, the system BIOS software stored in non-volatile BIOS memory 124 is copied into main memory 125 so that it can be executed more quickly. This technique is referred to as "shadowing" or "shadow RAM" as discussed above. At this time, SMM code 650 is also copied into the system management mode memory area 126 of main memory 125. CPU 105 executes SMM code 650 after CPU 105 receives a system management interrupt ("SMI") which causes the microprocessor to enter SMM. It is noted that along with SMM code 650, also stored in BIOS memory 124 and copied into main memory 125 at power up are system BIOS 155 (including a power on self test module-POST) and video BIOS 660. Those of ordinary skill in the art will recognize that other memory mapping schemes may be used. For example, SMM code 650 may be stored in fast SRAM memory (not shown) coupled to the local/CPU bus 120.

Figure 4:
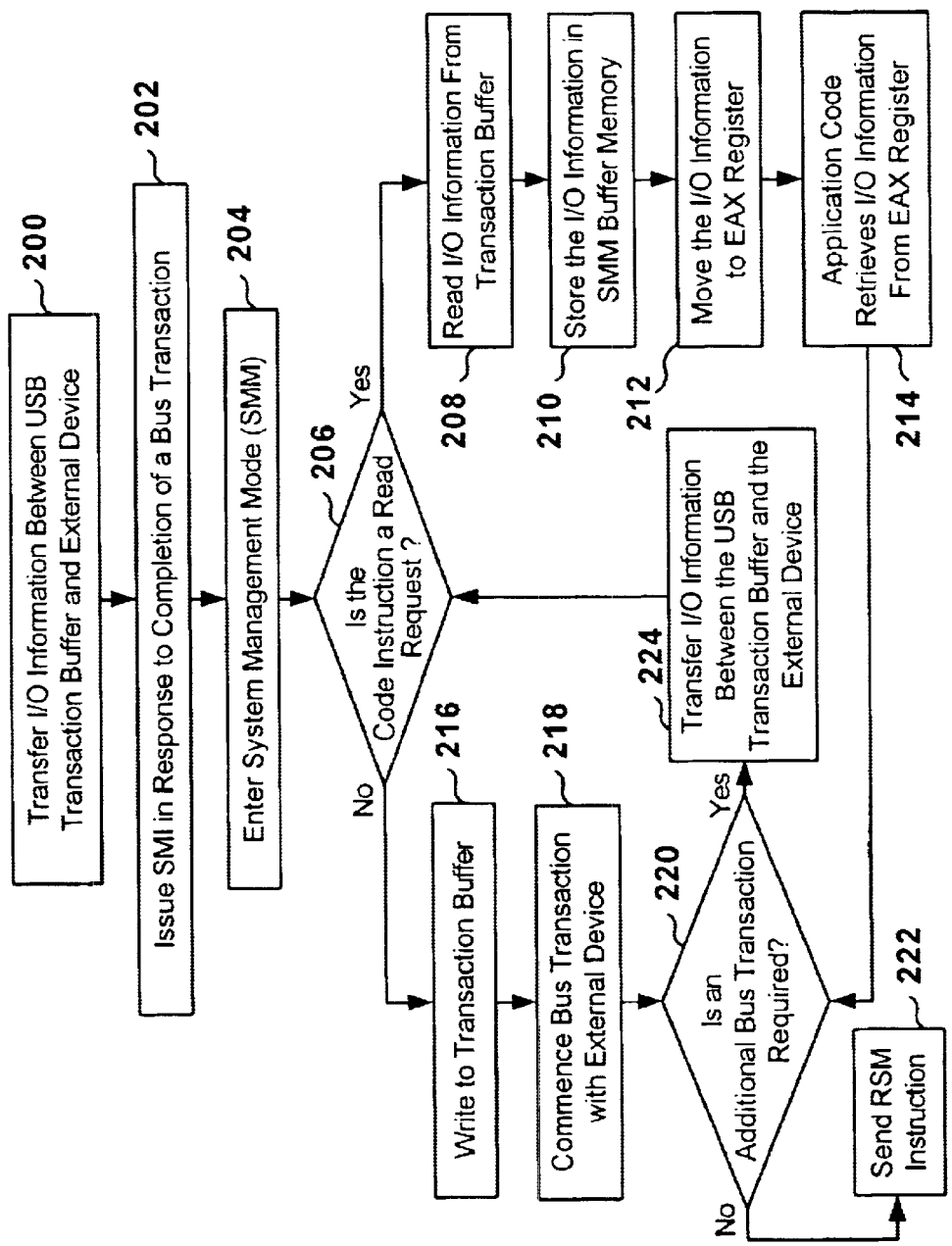
FIG. 4 is a flow diagram showing a conventional method for communication over a universal serial bus.

Referring to FIG. 4, with the system BIOS 155 thus copied into main memory 125, operation of the PCT system 100 starts with the power-on-self-test ("POST") module of the BIOS to commence initialization of PC system 100. The POST routine includes verification of system hardware functionality such as hard disk drive 180, CPU 105 registers, and floppy disk drive 185. During operation, the CPU 105 typically receives multiple requests for interrupt to facilitate communication between the various system resources of the computer system source 100. A subset of the aforementioned interrupt requests may concern I/O activity with one or more of the external devices, e.g., keyboard 122, auxiliary device I 127 and auxiliary device II, 131. Another subset of the system resources that may produce interrupts are software applications, the operating system and the like. However, the present discussion will concern I/O activity over the universal bus 160, i.e., write or read requests to and from one of the aforementioned external devices.

Typically, I/O activity with the aforementioned external devices occurs in response to transfer request, e.g., an I/O request packet (IRP) from one of the system resources, for example, application software. In response to the IRP, I/O information is transferred between the USB transaction buffer, which is part of the system memory, and the external device that is the subject of the I/O activity at step 200. The USB transaction buffer temporarily stores the I/O information. Upon completion of one of the bus transactions, interrupt logic (not shown) in USB controller 101 issues an SML to CPU 105 at step 202. Upon receiving the SMI, at step 202, the CPU 105, in a well-known manner, stores current register values necessary to restore the original condition in main memory 125 and enters SMM at step 204. For example, after receiving an SMI, CPU 105 stores its current registers, including the current code segment ("CS") and extended instruction pointer ("EIP") registers, and begins executing SMM code in system management memory 126. In this manner, the CPU 105 determines the source of the SMI.

SMM code 650 then processes the transaction by passing instructions to the CPU 105. For example, were SMM code 650 to determine that an application code instruction requested a read (input from I/O device) at step 206, SMM code 650 proceeds to read the data input stored in a USB transaction buffer at step 208. SMM code 650 then proceeds to store the information from the USB transaction buffer in a reserved SMM memory buffer within SMM memory 126 at step 210. Thereafter, the SMM code 650, instructs CPU 105 to move the information from the SMM memory buffer to the register EAX at step 212. In this manner, the application code may now retrieve data from register EAX, which is where the application code expects the data to be located at step 214. Were SMM code 650 to determine that an application code instruction requested a write (input to the I/O device) at step 206 MM code 650 proceeds to write data to the USB transaction buffer at step 216. Thereafter, at step 218, the bus transaction would occur transmitting the information in the USB transaction buffer to the external device.

As stated above, I/O activity between the computer resources and an external device often require multiple transactions to facilitate a single transfer of information. To that end, after both steps 214 and 218, the USB controller 101 determines whether an additional bus transaction must occur to complete the data transfer between the computer resource and the external device at step 220. Were no other bus transaction required, then the bus controller would transmit an RSM instruction to the CPU 105, causing the same to exit SMM at step 222. Were an additional bus transaction required, then the I/O information is transferred between the USB transaction buffer, which is part of the system memory, and the external device that is the subject of the I/O activity at step 224. Thereafter, the method resumes at step 206 and continues as discussed above.

From the foregoing, it can be seen that the I/O activity associated with a single transfer between a computer resource and an external device requires a great amount of CPU 105 bandwidth, particularly were multiple bus transactions associated with a single transfer. This may require the CPU 105 to maintain SMM for periods of time sufficient to disrupt time sensitive application software. Considering that no additional interrupts may be sensed by the CPU 105 while in SMM mode, long periods of I/O activity on the USB can result in catastrophic failure of the PC system 100. This is seen when configuring a new external device to communicate over the USB. A typical configuration procedure requires four separate bus transactions per external device to complete configuration: obtaining an interface descriptor of the device; set a unique address to the external device; set configuration parameters for the new device; and establish a boot protocol. The configuration procedure in particular can require several seconds to complete which would substantially interfere with the operation of computer system 100, particularly when a new added external device is done in accordance with hot-plugging.

To avoid the aforementioned problem a substantial portion of the communication over the USB occurs when the CPU 105 is either in the real-mode or protected mode, i.e., not in the SMM mode. This is achieved by having the SMM code include an SMI handler that tracks the communication between the USB controller 101 and an external device, such as keyboard 122, auxiliary device I 127 or auxiliary device II 131 that is subject of the I/O activity. Specifically, after the bus transaction between the USB and the external device commences, the SMM code sends to the CPU 105 SMI pin a resume instruction RSM at step 300. In response to the RSM instruction, execution of the operating system and applications software code commences. Upon determining that the bus transactions have completed, the USB controller 101, at step 302, causes the BIOS to execute an SMI, causing the CPU 105 to enter the SMM code, as discussed above. At step 304, I/O activity is completed by transferring information between the USB transaction buffer and the requisite resource of the computer system 100 while in the SMM mode, as discussed above. Thereafter, the SMM code once again sends an RSM instruction to the CPU 105, causing the same to exit SMM at step 306 and continue execution of the operating system and applications software at step 308. Subsequently, at step 310, the USB controller 101 determines whether there are additional bus transactions to be commenced. If so, steps 300, 302, 304, 306 and 308 are repeated. If not, I/O activity ends at step 312. In this manner, the time that the CPU 105 is in the SMM mode is reduced, thereby reducing the probability that time sensitive applications will be disrupted by being denied access the CPU 105 bandwidth.

Figure 5:
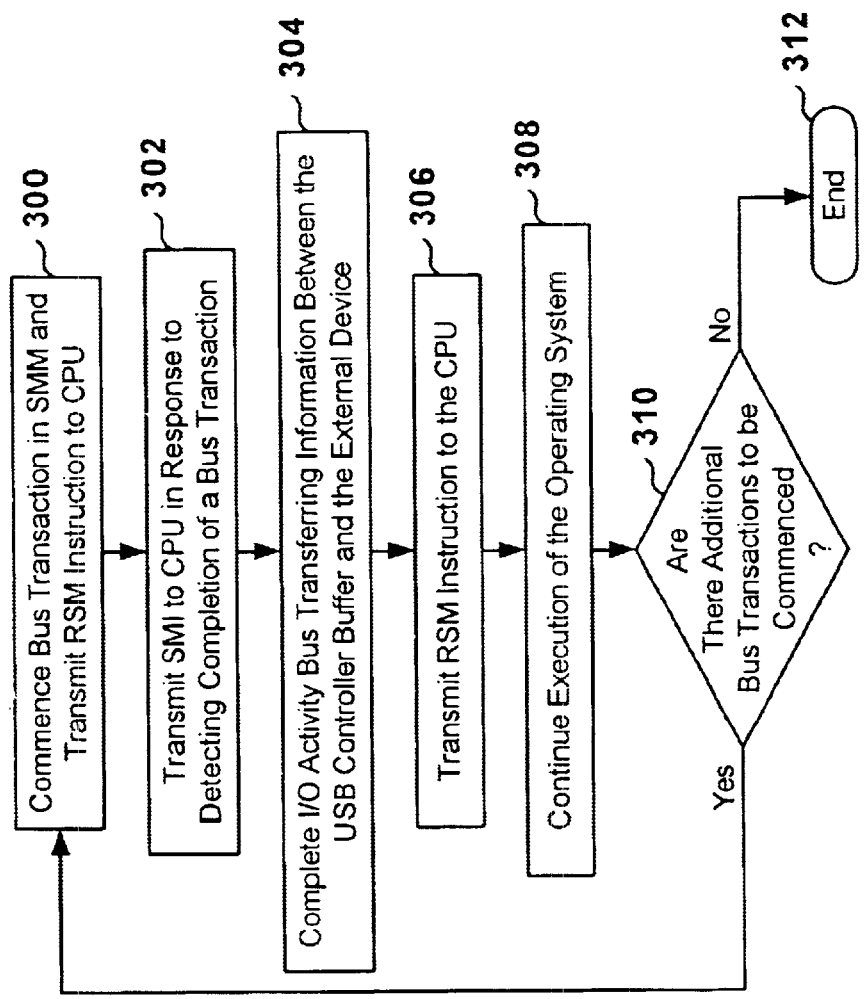
FIG. 5 is a flow diagram showing the method of facilitating communication over a universal serial bus in accordance with the present invention.
Figure 6:
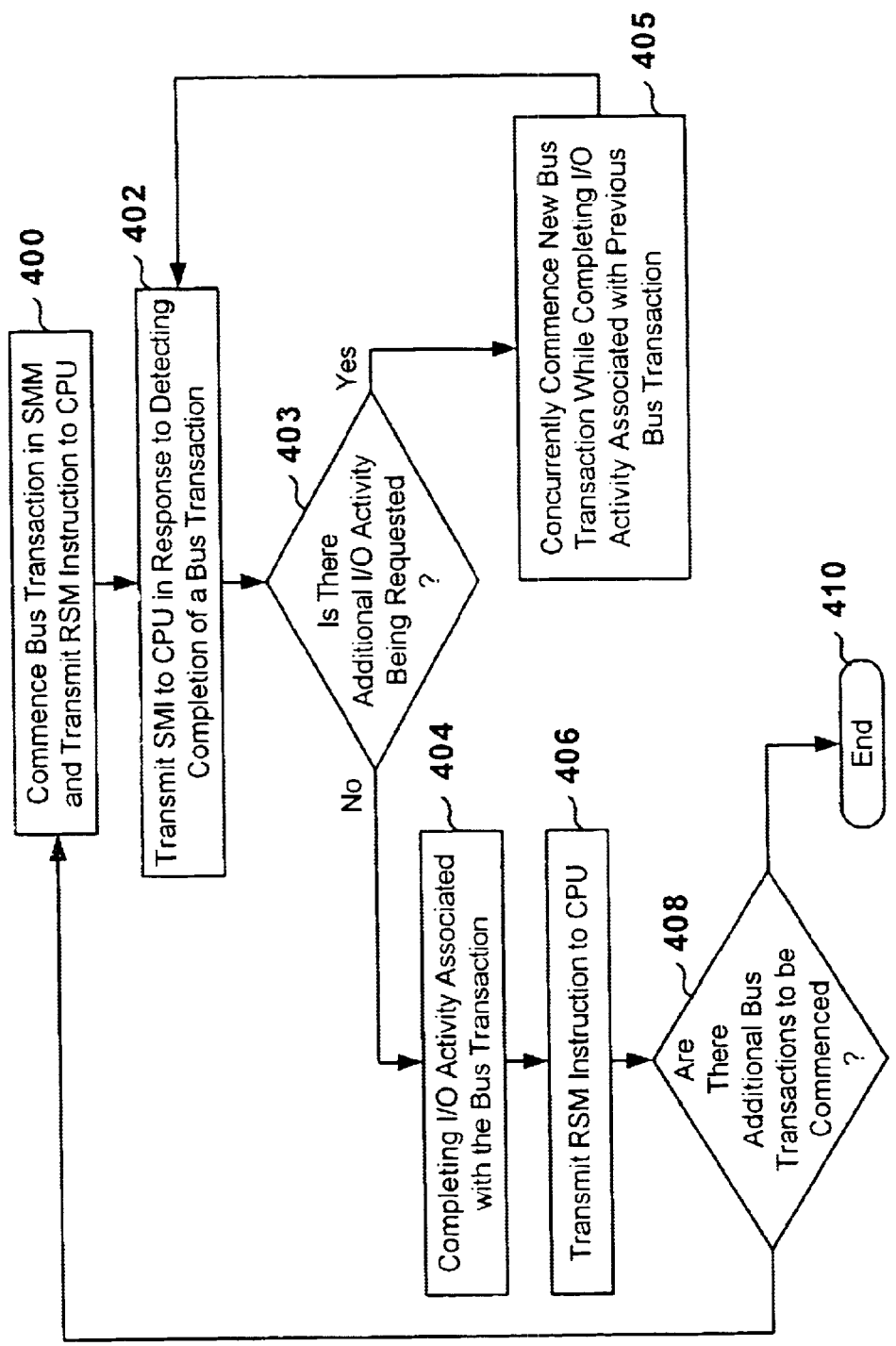
FIG. 6 is a flow diagram showing the method of facilitating communication over a universal serial bus in accordance with an alternate embodiment of the present invention.

Referring to FIGS. 3, 5 and 6, to further reduce the time that the CPU 105 is in SMM mode, concurrently with reading the USB transaction buffer and passing the information therein to the requisite resource of the computer system 100, a new USB transaction may be commenced. In this manner, I/O activity with an additional external device may be achieved while completing previous I/O activity. To that end, the method for implementing I/O activity includes commencing a bus transaction in SMM and transmitting an RSM instruction to the CPU 105 at step 400. At step 402, the USB controller 101 determines that the bus transactions have completed and causes the BIOS to execute an SMI, causing the CPU 105 to enter the SMM code. At step 403, the SMM code determines whether there is additional I/O activity that is to occur, for example, between the application code and another external device. If yes, then concurrently with completing the I/O activity associated with the current bus transaction, an additional bus transaction is commenced at step 405. The additional bus transaction is associated with the new I/O activity. Subsequently, steps 402 and 403 are repeated.

If it were determined that there was no additional I/O activity at step 403, then the I/O activity is completed at step 404, and the SMM code once again sends an RSM instruction to the CPU 105 at step 406. Thereafter, at step 408, the SMM code determines whether there are additional bus transactions to be commenced. If so, steps 400, 402 and 403 are repeated. If not, I/O activity ends at step 410. In this manner, the time that the CPU 105 is in the SMM mode is reduced, thereby reducing the probability that time sensitive applications will be disrupted by being denied access the CPU 105 bandwidth.

As described above, the communication over the USB bus may be achieved when the CPU 105 is not in the SMM mode, thereby greatly freeing up the CPU to handle other interrupts and processes required by the computer system 100. It should be understood that the invention described above in merely exemplary. The scope of the present invention should not, therefore, be determined with respect to the above-described exemplary embodiments. Rather, the breadth of the present invention should be determined with respect to the claims recited below, including the full scope of equivalents thereof.

What is claimed is:

1. A method of transferring data over a bus in a computer system having a processor with System Management Mode architecture, said method comprising:

commencing an information transfer after said processor has commenced said System Management Mode, said information transfer including a plurality of bus transaction;

exiting said System Management Mode before completion of said information transfer;

processing, with a bus controller, a portion of said transfer in lie of processing by said processor;

providing a bus controller and a device, said device having a function associated therewith and being in data communication with said bus controller over said bus, with said bus controller being in data communication with said processor, and said commencing an information transfer after said processor has commenced said System Management Mode including sending to said processor, from said bus controller, an interrupt request, before said commencing an information transfer; and wherein said bus controller has client software associated therewith and further including providing a plurality of devices in data communication with said bus controller, polling, each of said plurality of devices, to determine the presence of an interrupt request.

2. The method as recited in claim 1 further including completing one of said plurality of bus transactions before entering said System Management Mode.

3. The method as recited in claim 1 further including providing bus controller transmitting an SMI to said processor upon a termination of said bus transaction.

4. The method as recited in claim 1 wherein one of said plurality of bus transactions includes I/O information and said computer system has a plurality of system resources and further including after exiting said System Management Mode, entering said System Management Mode and transferring said I/O information to one of said plurality of system resources.

5. The method as recited in claim 1 wherein one of said plurality of bus transactions includes I/O information and said computer system has a plurality of system resources and further including after exiting said System Management Mode, entering said System Management Mode and transferring said I/O information to one of said plurality of system resources and concurrently commencing an additional bus transaction.

6. The method as recited in claim 1 further including providing a system controller I/O trap wherein said commencing an information transfer after said processor has commenced said System Management Mode further includes intercepting said interrupt request with said system controller I/O trap and transmitting an SMI to said processor in response thereto.

7. A computer system comprising:

a memory having a program stored therein;

a communication bus;

a device;

a bus controller in data communication with said device over said communication bus;

a processor, in data communication with said memory and said bus controller, with said program including program code to commence a bus transfer after said processor has commenced said System Management Mode, said bus transfer including a plurality of bus transactions and code to complete one of said plurality of bus transactions after said processor has exited said System Management Mode, and code in said bus controller to perform a portion of said transaction; and program code to complete said one of said plurality of bus transactions before entering said System Management Mode.

8. The computer system as recited in claim 7 further including code defining an SMI handler to monitor said bus transaction and to cause an SMI to be transmitted to said processor upon a termination each of said bus transactions.

9. The computer system as recited in claim 7 wherein said plurality of bus transactions include I/O information and said computer system has a plurality of system resources and further including code to enter said System Management Mode and transfer said I/O information to one of said plurality of system resources after completion of each of said plurality of bus transactions.

10. The computer system as recited in claim 7 wherein said computer system further includes a bus controller and a device, said device having a function associated therewith and being in data communication with said bus controller over said bus, with said bus controller being in data communication with said processor, with said bus controller including a software client having code associated therewith to send an interrupt request to said processor before said bus transaction is commenced.

11. The computer system as recited in claim 9 wherein said code to enter said System Management Mode further includes code to commence an additional bus transaction concurrently with entering said System Management Mode and transfer said I/O information.

* * * * *